US008933896B2

(12) United States Patent
Honji et al.

(10) Patent No.: US 8,933,896 B2
(45) Date of Patent: Jan. 13, 2015

(54) PRESSURE-BASED INTERACTION FOR INDIRECT TOUCH INPUT DEVICES

(75) Inventors: Scott Honji, Sammamish, WA (US); Masahiko Kaneko, Fall City, WA (US); Sarah Williams, Seattle, WA (US); Vincent Ball, Kirkland, WA (US); Paul Millsap, Issaquah, WA (US); Jan-Kristian Markiewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 13/280,346

(22) Filed: Oct. 25, 2011

(65) Prior Publication Data

US 2013/0100045 A1    Apr. 25, 2013

(51) Int. Cl.
*G06F 3/041* (2006.01)
*G06F 3/0488* (2013.01)

(52) U.S. Cl.
CPC .......... *G06F 3/0416* (2013.01); *G06F 3/04883* (2013.01); *G06F 2203/04808* (2013.01)
USPC ........................................................ 345/173

(58) Field of Classification Search
None
See application file for complete search history.

(56) References Cited

U.S. PATENT DOCUMENTS

| | | | |
|---|---|---|---|
| 5,616,078 | A | 4/1997 | Oh |
| 7,855,718 | B2 | 12/2010 | Westerman |
| 2003/0169277 | A1 | 9/2003 | Patton |
| 2003/0222856 | A1 | 12/2003 | Fedorak |
| 2005/0110769 | A1* | 5/2005 | DaCosta et al. ............... 345/173 |
| 2006/0033712 | A1 | 2/2006 | Baudisch |
| 2006/0244735 | A1 | 11/2006 | Wilson |
| 2006/0267953 | A1* | 11/2006 | Peterson et al. ............... 345/173 |
| 2006/0279548 | A1* | 12/2006 | Geaghan ........................ 345/173 |
| 2007/0126743 | A1 | 6/2007 | Park |

(Continued)

FOREIGN PATENT DOCUMENTS

| | | |
|---|---|---|
| JP | 3151652 U9 | 6/2009 |
| KR | 10-2010-0054275 A | 5/2010 |

(Continued)

OTHER PUBLICATIONS

"International Search Report", Mailed Date: Feb. 15, 2013, Application No. PCT/US2012/066564, Filed Date: Nov. 27, 2012, pp. 9.

(Continued)

*Primary Examiner* — Antonio Xavier
(74) *Attorney, Agent, or Firm* — Jeremy Snodgrass; Sergey Lamansky; Micky Minhas

(57) ABSTRACT

In an indirect interaction input device, z-information can be considered in defining a user interaction model for the device. Any measurement of displacement in a z-direction can be used, if such information is available from the input device. The pressure data can be used to define states of interaction, with transitions between these states determined by various thresholds. The device can provide raw or normalized data, and can provide state information or data defining its thresholds that specify state transitions. This information can be provided as an attribute of a contact point provided by the device. Data can be normalized across various similar devices. Applications can use the raw pressure data from the device for their own purposes, or rely on the device itself or host operating system software to interpret the pressure data according to thresholds and states.

20 Claims, 4 Drawing Sheets

(56) References Cited

U.S. PATENT DOCUMENTS

| | | | |
|---|---|---|---|
| 2007/0229455 A1* | 10/2007 | Martin et al. | 345/156 |
| 2007/0257891 A1 | 11/2007 | Esenther et al. | |
| 2008/0001923 A1 | 1/2008 | Hall | |
| 2008/0001926 A1 | 1/2008 | XiaoPing | |
| 2008/0024459 A1* | 1/2008 | Poupyrev et al. | 345/173 |
| 2008/0024505 A1 | 1/2008 | Gordon | |
| 2008/0122798 A1* | 5/2008 | Koshiyama et al. | 345/173 |
| 2008/0259053 A1* | 10/2008 | Newton | 345/175 |
| 2009/0046110 A1* | 2/2009 | Sadler et al. | 345/660 |
| 2009/0058829 A1* | 3/2009 | Kim et al. | 345/173 |
| 2009/0085881 A1* | 4/2009 | Keam | 345/173 |
| 2009/0122007 A1* | 5/2009 | Tsuzaki et al. | 345/156 |
| 2009/0128516 A1 | 5/2009 | Rimon et al. | |
| 2009/0184939 A1 | 7/2009 | Wohlstadter | |
| 2009/0225049 A1 | 9/2009 | Liu | |
| 2009/0232353 A1 | 9/2009 | Sundaresan | |
| 2009/0256800 A1 | 10/2009 | Kaufman | |
| 2009/0256817 A1 | 10/2009 | Perlin et al. | |
| 2009/0284479 A1 | 11/2009 | Dennis et al. | |
| 2010/0020025 A1 | 1/2010 | Lemort et al. | |
| 2010/0079493 A1 | 4/2010 | Tse | |
| 2010/0097342 A1 | 4/2010 | Simmons | |
| 2010/0139990 A1* | 6/2010 | Westerman et al. | 178/18.03 |
| 2010/0289754 A1 | 11/2010 | Sleeman | |
| 2010/0328227 A1 | 12/2010 | Matejka | |
| 2011/0007021 A1* | 1/2011 | Bernstein et al. | 345/174 |
| 2011/0012835 A1 | 1/2011 | Hotelling | |
| 2011/0025648 A1 | 2/2011 | Laurent et al. | |
| 2011/0032198 A1* | 2/2011 | Miyazawa et al. | 345/173 |
| 2011/0047504 A1 | 2/2011 | Wienands | |
| 2011/0050394 A1 | 3/2011 | Zhang et al. | |
| 2011/0063248 A1* | 3/2011 | Yoon | 345/174 |
| 2011/0193809 A1* | 8/2011 | Walley et al. | 345/173 |
| 2011/0230238 A1 | 9/2011 | Aronsson et al. | |
| 2011/0248948 A1* | 10/2011 | Griffin et al. | 345/174 |
| 2012/0050180 A1* | 3/2012 | King et al. | 345/173 |
| 2012/0105357 A1 | 5/2012 | Li | |
| 2012/0242586 A1 | 9/2012 | Krishnaswamy | |

FOREIGN PATENT DOCUMENTS

| | | |
|---|---|---|
| KR | 10-2011-0076292 A | 7/2011 |
| WO | 99-38149 A1 | 7/1999 |
| WO | 2006-020305 A2 | 2/2006 |
| WO | 2011049513 A1 | 4/2011 |
| WO | 2011-082477 A1 | 7/2011 |

OTHER PUBLICATIONS

"International Search Report", Mailed Date: Feb. 20, 2013, Application No. PCT/US2012/061742, Filed Date: Oct. 24, 2012, pp. 9.

"International Search Report", Mailed Date: Feb. 7, 2013, Application No. PCT/US2012/061225, Filed Date: Oct. 20, 2012, pp. 16.

Fragiacomo, et al., "Novel Designs for Application Specific MEMS Pressure Sensors", Retrieved at <<http://www.mdpi.com/1424-8220/10/11/9541/pdf, Sensors, vol. 10, No. 11, 2010, pp. 9541-9563.

U.S. Appl. No. 13/277,222, first office action mailed Jul. 23, 2013.

U.S. Appl. No. 13/277,222, second office action, mailed Nov. 29, 2013.

U.S. Appl. No. 13/277,222, third office action, mailed Aug. 5, 2014.

U.S. Appl. No. 13/277,220, first office action, mailed Feb. 5, 2014.

U.S. Appl. No. 13/277,220, second office action, mailed Jun. 25, 2014.

U.S. Appl. No. 13/306,989, first office action, mailed Dec. 13, 2013.

U.S. Appl. No. 13/306,989, second office action, mailed Sep. 2, 2014.

* cited by examiner

PRESSURE-BASED INTERACTION FOR INDIRECT TOUCH INPUT DEVICES

BACKGROUND

Manual input devices used for navigation and control of a computing system have a significant impact on the capabilities of the system and the user's overall experience. There are several kinds of manual input devices used for navigation and control of a personal computer, the most common of these including single-pointer, indirect interaction devices, such as a mouse or touchpad, and direct interaction devices, such as a touchscreen and pen and tablet devices.

Most input devices have buttons in addition to their position information. For example, dual-state mechanical buttons are common on mice. Pen digitizers also typically have pressure-responsive devices in the tip and/or stylus barrel, which transmit tip and barrel pressure values, respectively. Most software drivers for pen digitizers implement a form of mouse emulation in process tip-related data. Also, buttons and other mechanisms generally are processed as independent inputs of the input device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An indirect interaction input device, such as a touch sensor, can provide multiple input points. For example, a touch-sensitive sensor can provide data indicating two or more positions in a coordinate space where a user is touching the sensor. Such a sensor can be rectangular in shape, but can have other shapes. The sensor can appear similar to a touchpad, but, instead of tracking motion of a single point, it detects multiple points touched by the user. These multiple points are in turn mapped to multiple positions on a display.

In addition to mapping points from display to device coordinates in two dimensions, an additional dimension, herein called z-information or depth, also can be considered in defining a user interaction model for the device. Any measurement of displacement in a z-direction, i.e., on an axis perpendicular to the plane of the contacts, such as pressure applied to the contacts, can be used, if such information is available from the input device. The pressure data can be used to define states of interaction, with transitions between these states determined by various thresholds. The device can provide raw or normalized data, and can provide state information or data defining its thresholds that specify state transitions. This information can be provided as an attribute of a contact point provided by the device. A device driver, the host operating system's input processor, or applications can normalize the data across various similar devices. Applications can use the raw pressure data from the device for their own purposes, or rely on the device itself or host operating system software to interpret the pressure data according to system- or device-defined thresholds and states.

Accordingly, in one aspect, Information describing contact points on a touch device are received into memory. Z-direction information also is received from the input device. Behavior related to the contact points is modified by the device, the host operating system, or the application according to the z-direction information, and state transitions and other interactions can be effected.

In one embodiment, a plurality of thresholds is applied to the z-direction information to define a plurality of states of the input device. The state can be defined independently for each contact applied to the input device. Alternatively, the state can be defined for all contacts on the input device. The pressure signal of multiple contacts can be combined into a singular actuation in several ways. For example, a contact exhibiting a highest pressure can be used to actuate state transitions. An average pressure, such as the mean value, for all contacts can be used to actuate state transitions. A contact exhibiting a highest pressure can be used to advance the interaction state (entry) and the contact with least pressure can be used to regress the interaction state (exit). The plurality of states can include, for example, the sequence of an idle state, a hover state and an engage state. Engage entry and engage exit thresholds can be the same or different values. Hover entry and hover exit thresholds can be the same or different values. Hover and engage entry and exit thresholds can be zero, meaning that the hover state can be omitted, and transitions between idle and engage can be triggered by simply applying or removing a contact. The plurality of states can include an engage locked state, which is entered by a transition from any other state when the pressure exceeds a particular threshold. After entry into the engage locked state, the engage locked state is exited by a pressure change from below the threshold and over the threshold again.

The thresholds used to define the states can be stored in the device, or can be defined and managed by the host operating system or an application using data from the device. Device state can be an attribute of a contact in a list of contacts made on the device. An application or the host operating system can inhibit access to one or more states. Z-direction information can be normalized across devices. The rate of change of z-direction information can be determined, and data from the input device can be processed according to the rate of change of z-direction information.

An application can have a related setting to opt in and opt out of use of z-direction information. For example, the application can receive only the state information and neither raw nor normalized pressure data. The application can receive raw z-direction data. The application can receive normalized z-direction data. The application can receive z-direction information and not state information. The z-direction information can represent pressure data.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which an indirect touch input device can be used.

Figure 1:
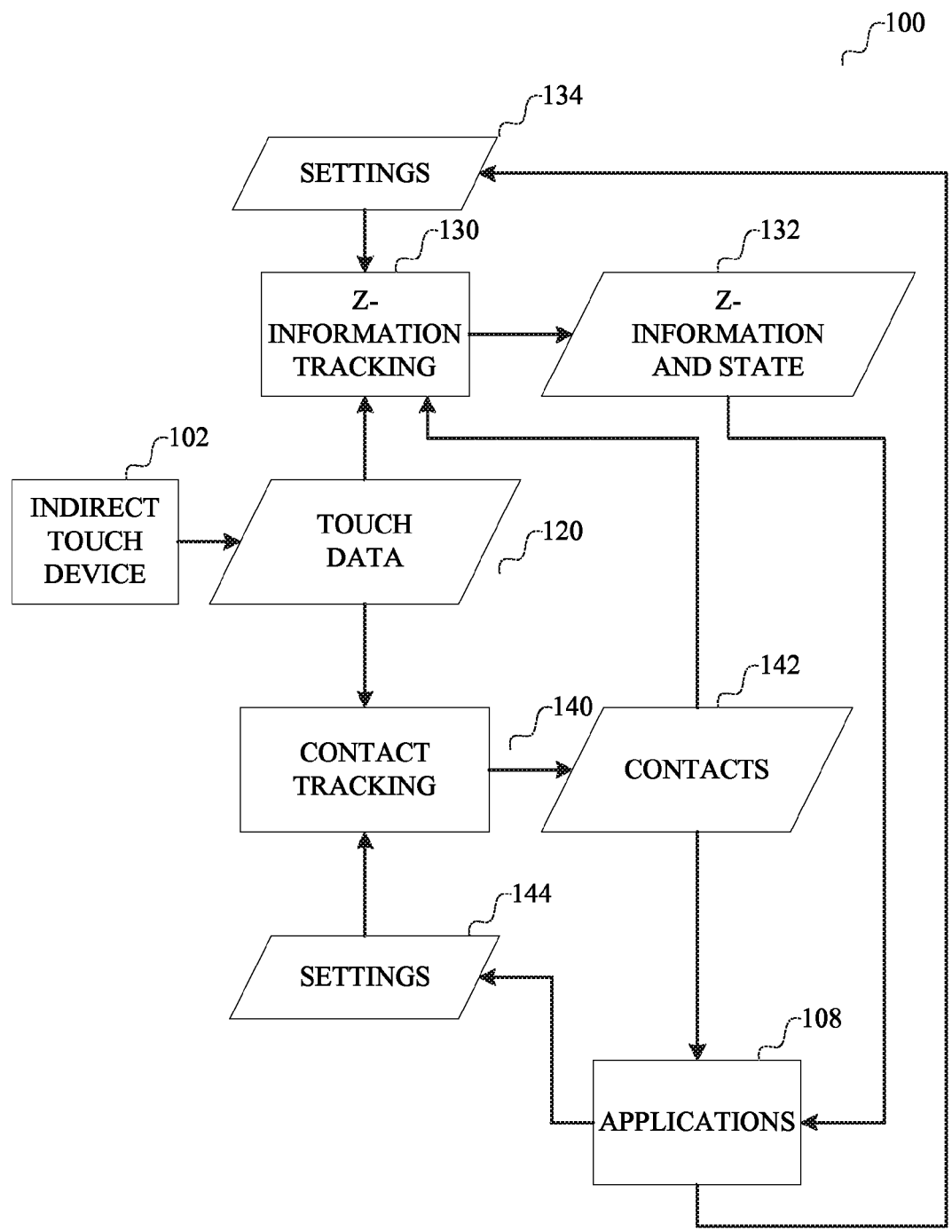
FIG. 1 is a block diagram of a system using an indirect touch device.

Referring to FIG. 1, a computer system 100 includes an indirect touch device 102 connected to a computer platform (details of which are described below). The computer platform has an operating system which manages interaction between one or more applications 108 and resources of the computer platform, such as its peripheral devices including the indirect touch device.

Within the operating system, touch data 120 is received from the indirect touch device 102. The touch data 120 can include information about contact points in x and y dimensions and z-information. The contact information is processed by a contact tracking module 140, according to settings 144, to provide contact information 142 to applications 108. In general the contact information 142 can include a list of contacts for each frame of time in which data is provided by the indirect touch device 102. Each point can be treated by the operating system and/or applications 108 in a manner similar to any single point, e.g., for selection of a displayed item, or in a manner similar to multiple points from direct touch input devices, e.g., shrinking or enlarging a displayed item. The range of possible uses of the multiple points, once mapped to the display, is not limiting for this invention.

The other data that is received from the indirect touch device is a measurement of displacement in a z-direction, i.e., on an axis perpendicular to the plane of the contacts, such as pressure applied to the contacts.

Examples of input devices that have this kind of data include, but are not limited to, capacitive touch sensors with a sensor button, capacitive touch sensor with contact area discrimination, mechanical pressure sensors, image sensors such as the KINECT system from Microsoft Corporation, an optical stylus that measures distance from a surface, sensors that optically measure distance of objects from the sensor surface such as the SURFACE system from Microsoft Corporation, three dimensional motion sensing systems and squeeze based input devices.

This z-direction information is processed by the z-information tracking module 130 according to settings 134, to provide z-information and state data 132, which can be used by applications 108.

In one implementation of the z-information tracking module, different thresholds of displacement in the z-direction are used to effect changes in states of interaction with the input device. In one example, the input device has three states: idle, hover and engage. The state can be defined per contact or for the whole input device depending on the data available from the input device.

Figure 2:
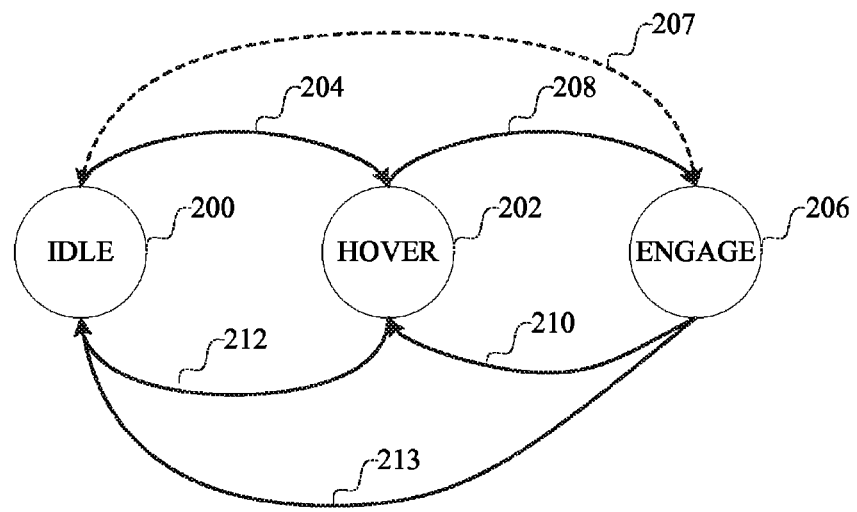
FIG. 2 is a state diagram illustrating an example implementation of using z-information.

As shown in FIG. 2, a state diagram of the input device indicates that it is initially in the idle state. In the idle state 200, the z-direction information is continually processed to evaluate it against a first, entry threshold. When the signal is greater than the first threshold, the device transitions to a hover state 202, as indicated at 204. In the hover state, if the signal is greater than or equal to a second, engage entry threshold, the device transitions to an engage state 206, as indicated at 208. In the hover state, if the signal is less than or equal to a third, acquire exit threshold, the device transitions back to the idle state 200, as indicated at 210. In the engage state, if the signal is less than or equal to a fourth, non-zero engage exit threshold, the device transitions back to the hover state 202 as indicated at 212. If the engage exit threshold is zero, then once in the engage state, the device remains in that state until contact is removed entirely from the sensor, as indicated at 213. The transition from the idle state to the hover state signifies the beginning of a contact session, while a transition to the idle state signifies the end of a contact session.

The engage entry and engage exit thresholds, driving transitions between the hover and engaged states, can be the same or different values. For example, assuming an increasing z value indicates engagement, the engage exit threshold (for transitioning back to the hover state) can be less than the engage entry threshold. Similarly, the entry and exit thresholds, driving transitions between the idle and hover states, also can be the same or different values. For example, assuming an increasing z value indicates engagement, then the exit threshold (for transitioning back to the idle state), can be less than the entry threshold. However, the entry threshold is typically a value just above zero, as the idle state represents no contact or mere incidental contact with the device. Thus, the exit threshold represents the termination of a contact session and typically is zero. Hover and engage entry and exit thresholds can be zero, meaning that the hover state can be omitted, and transitions between the idle and engage state, as shown by the dashed arc at 207, can be triggered by simply applying or removing a contact.

Figure 3:
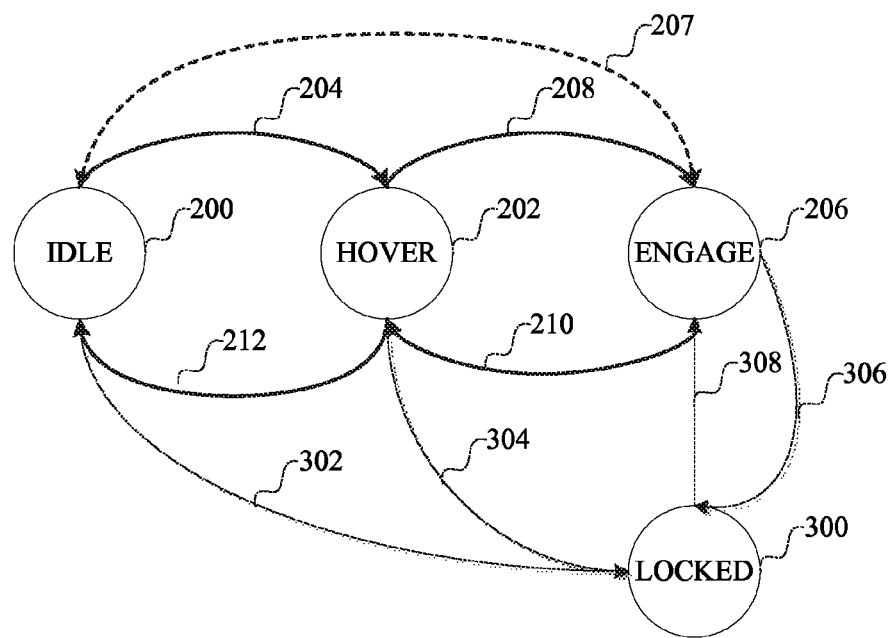
FIG. 3 is a state diagram illustrating another example implementation of using z-information.

In another implementation shown in FIG. 3 (in which the same reference numbers as found in FIG. 2 signify the same element), the engage state can be locked (actually, another state 300). This locked state 300 can be entered by a transition 302, 304, 306, from any other state when the pressure exceeds a fifth, lock entry threshold which is greater than the first through fourth thresholds. After entry into the locked state, the state can be exited, for example, by another change in the pressure from a value below to a value above the fifth threshold. A transition 308 from the locked state to the engage state occurs.

The thresholds used to define the user experience with the device (settings 134 in FIG. 1) can be stored in the device and provided to the computer system when the device is installed, or can be managed by a device driver, host operating system, or an application. A device driver, the host operating system's input processor, or the application(s) to which the raw pressure data is routed, can manage and track device states and transitions between device states, implementing a z-information tracking module (130 in FIG. 1). The device state can be an attribute of a contact in the list of contacts (142 in FIG. 1) that is provided to other applications. Such a device driver or the host operating system's input processor can be configured to accept input from applications that constrain the available transitions. For example, and application can instruct the device driver or operating system input processor that transitions to some states within the application can be blocked, such as the locked state. Thresholds for device states can be defined by applications, allowing custom user experiences to be defined by the applications.

If state of the device is defined for all contacts on the input device, the z-information related to the multiple contacts can be combined into a singular actuation in several ways. For example, a contact exhibiting a highest pressure can be used to actuate state transitions. An average pressure, such as the mean value, for all contacts can be used to actuate state transitions. A contact exhibiting a highest pressure can be used to advance the interaction state (entry) and the contact with least pressure can be used to regress the interaction state (exit).

If behaviors are defined through a software layer which can receive inputs from multiple different types of devices, the thresholds for state changes can be set in relation to normalized device data. Device data normalization generally involves a nonlinear mapping of the range of input from the device to a normalized range, and can be implemented using a lookup table. In one implementation, host-based software, such as a device driver or user level process available as a service to other applications, receives the data from the device and normalizes it. The normalized pressure data can be an attribute of a contact in a list of contacts that is provided to other applications.

Applications also can be enabled to opt in or opt out of use of z-information data, such as pressure data. In one implementation, if an application opts in, it receives only the state information and neither raw nor normalized pressure data. In another implementation, the application receives raw pressure data. In another implementation, the application receives normalized pressure data. In another implementation, only pressure data is received and state information is not.

Other behaviors also can be defined based on the displacement over time in the z-direction, e.g., differential pressure. A segmented linear transform calculation can be applied to an input representing the z-direction displacement or velocity to map it to an output response. The output response can be any of a variety of controls, such as volume, shuttle, or zoom velocity, or other application-defined behaviors. Such a mapping can be performed from a group of input points based on the differential of one input point, such as the input point with the smallest magnitude differential. Or, such a mapping can be performed for each input point individually. One potential application of accelerated manipulation under a single contact via pressure as an alternative to multi-finger manipulations is safe operation of a hand-held computer while operating a vehicle. Another application is being able to perform multiple, pressure-modulated operations simultaneously. An example is using two fingers on one hand to simultaneously modulate the rate of gunfire and forward motion in a video game. [As another example, a high rate of increase in contact pressure may accelerate video shuttling, volume increase, zoom in, or forward navigation in virtual 3D space.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 4:
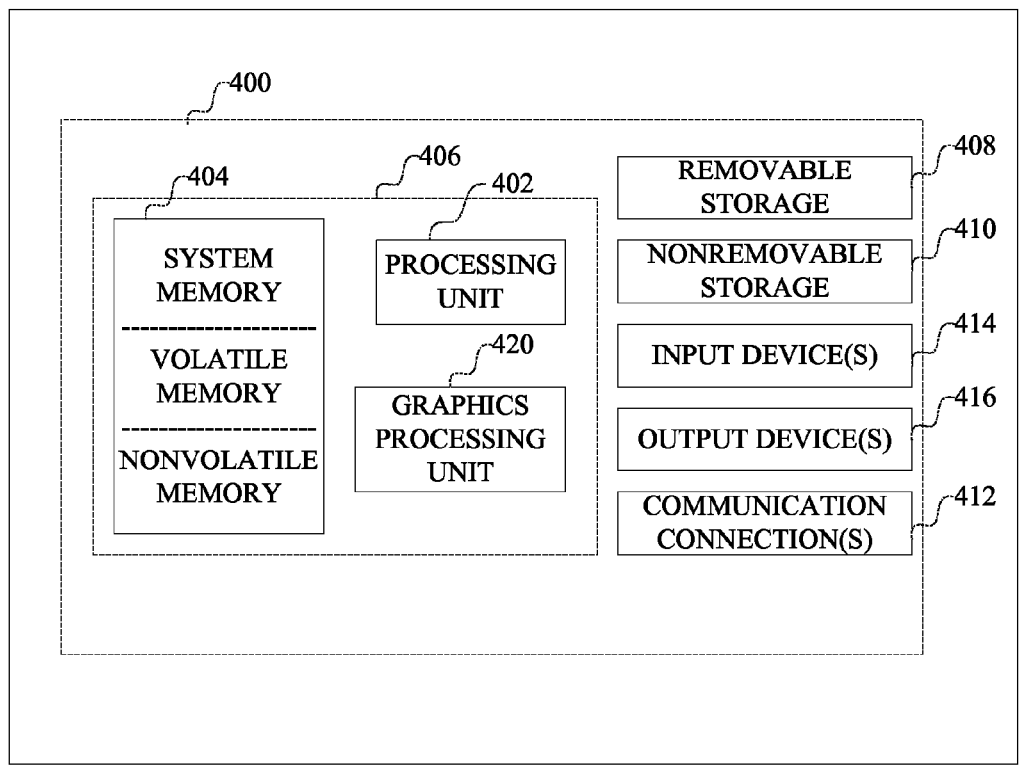
FIG. 4 is a block diagram of an example computing device in which such a system can be implemented.

FIG. 4 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 4, an example computing environment includes a computing machine, such as computing machine 400. In its most basic configuration, computing machine 400 typically includes at least one processing unit 402 and memory 404. The computing device may include multiple processing units and/or additional co-processing units such as graphics processing unit 420. Depending on the exact configuration and type of computing device, memory 404 may be volatile (such as RAM), non-volatile (such as ROM, flash memory, etc.) or some combination of the two. This most basic configuration is illustrated in FIG. 4 by dashed line 406. Additionally, computing machine 400 may also have additional features/functionality. For example, computing machine 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer program instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 400. Any such computer storage media may be part of computing machine 400.

Computing machine 400 may also contain communications connection(s) 412 that allow the device to communicate with other devices. Communications connection(s) 412 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 400 may have various input device(s) 414 such as a keyboard, mouse, pen, camera, touch input device, and so on. Output device(s) 416 such as a display, speakers, a printer, and so on may also be included. All of these devices are well known in the art and need not be discussed at length here.

The system can be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
receiving into memory information describing contact points on a touch device into memory;
receiving into memory z-direction information from the touch device;
generating in memory state information related to the contact points according to the z-direction information, by applying a plurality of thresholds to the z-direction information, the plurality of thresholds defining a plurality of states, the plurality of states including at least an idle state, an engage state associated with a first threshold for entry to the engage state, and an engage locked state associated with a second threshold for entry to the engage locked state, the second threshold exceeding the first threshold;
wherein the engage locked state is entered by a transition from any other state when the z-direction information exceeds the second threshold; and
wherein after entry into the engage locked state, the engage locked state is exited by a change in the z-direction information to below the second threshold and then over the second threshold.

2. The computer-implemented process of claim 1, wherein z-direction information is associated with each contact point on the touch device, and the state information is generated for each contact point on the touch device.

3. The computer-implemented process of claim 1, wherein z-direction information is associated with each contact point on the touch device, and the state information is generated for the touch device as a whole by combining the z-direction information from the contact points.

4. The computer-implemented process of claim 1, wherein the plurality of states further includes a hover state associated with a third threshold for entry to the hover state, the third threshold being less than the first and second thresholds.

5. The computer-implemented process of claim 4, wherein the hover state is associated with a fifth threshold for exiting the hover state, wherein the fifth threshold is different from the third threshold.

6. The computer-implemented process of claim 1, wherein the engage state is associated with a fourth threshold for exiting the engage state, wherein the second threshold is different from the fourth threshold.

7. The computer-implemented process of claim 1, wherein the plurality of thresholds used to define the plurality of states are stored in the touch device.

8. The computer-implemented process of claim 1, wherein the plurality of thresholds that define the plurality of states are defined by an application using data from the touch device.

9. The computer-implemented process of claim 1, wherein the generated state information is an attribute of one or more of the contact points in a list of the contact points on the touch device.

10. The computer-implemented process of claim 1, further comprising determining a rate of change of the z-direction information and processing the contact points from the touch device according to the rate of change of the z-direction information.

11. A system comprising:
a memory;
a processor in communication with the memory, the processor configured to execute the following steps:
receiving into memory information describing contact points on the touch device into memory;
receiving into memory z-direction information from the touch device;
generating in memory state information related to the contact points according to the z-direction information, by applying a plurality of thresholds to the z-direction information, the plurality of thresholds defining a plurality of states, the plurality of states including at least an idle state, an engage state associated with a first threshold for entry to the engage state, and an engage locked state associated with a second threshold for entry to the engage locked state, the second threshold exceeding the first threshold;
wherein the engage locked state is entered by a transition from any other state when the z-direction information exceeds the second threshold; and
wherein after entry into the engage locked state, the engage locked state is exited by a change in the z-direction information to below the second threshold and then over the second threshold.

12. The system of claim 11, wherein z-direction information is associated with each contact point on the touch device, and the state information is generated for each contact point on the touch device.

13. The system of claim 11, wherein z-direction information is associated with each contact point on the touch device, and the state information is generated for the touch device as a whole by combining the z-direction information from the contact points.

14. The system of claim 11, wherein the plurality of states further includes a hover state associated with a third threshold for entry to the hover state, the third threshold being less than the first and second thresholds.

15. The system of claim 14, wherein the hover state is associated with a fifth threshold for exiting the hover state, wherein the fifth threshold is different from the third threshold.

16. A computer system having a touch device, comprising:
a contact tracking module having an input for receiving data from a touch device and an output providing, to memory, information describing contact points on the touch device;
a z-information tracking module having an input for receiving data from the touch device and an output providing, to the memory, state information related to the contact points according to the z-direction information, according to a plurality of thresholds, the plurality of thresholds defining a plurality of states, the plurality of states including at least an idle state, an engage state associated with a first threshold for entry to the engage state, and an engage locked state associated with a second threshold for entry to the engage locked state, the second threshold exceeding the first threshold, wherein the engage locked state is entered by a transition from any other state when the z-direction information exceeds the second threshold, and wherein after entry into the engage locked state, the engage locked state is exited by a change in the z-direction information to below the second threshold and then over the second threshold.

17. The computer system of claim 16, wherein z-direction information is associated with each contact point on the touch device, and the state information is generated for each contact point on the touch device.

18. The computer system of claim 16, wherein z-direction information is associated with each contact point on the touch device, and the state information is generated for the touch device as a whole by combining the z-direction information from the contact points.

19. The computer system of claim 16, wherein the plurality of states further includes a hover state associated with a third threshold for entry to the hover state, the third threshold being less than the first and second thresholds.

20. The computer system of claim 19, wherein the hover state is associated with a fifth threshold for exiting the hover state, wherein the fifth threshold is different from the third threshold.

* * * * *